(12) United States Patent
Kishimoto et al.

(10) Patent No.: US 7,150,041 B2
(45) Date of Patent: Dec. 12, 2006

(54) DISK MANAGEMENT INTERFACE

(75) Inventors: Toshimichi Kishimoto, Hadano (JP); Yoshio Mitsuoka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 821 days.

(21) Appl. No.: 10/021,550

(22) Filed: Dec. 18, 2001

(65) Prior Publication Data

US 2002/0161880 A1    Oct. 31, 2002

(30) Foreign Application Priority Data

Apr. 25, 2001 (JP) ............................. 2001-126968

(51) Int. Cl.
| | | |
|---|---|---|
| G06F 7/04 | (2006.01) | |
| G06F 7/58 | (2006.01) | |
| G06F 15/16 | (2006.01) | |
| G06F 17/30 | (2006.01) | |
| G06K 9/00 | (2006.01) | |
| G06K 19/00 | (2006.01) | |
| H04L 9/32 | (2006.01) | |

(52) U.S. Cl. .......................................... 726/12; 726/2
(58) Field of Classification Search ................. 726/12, 726/2
See application file for complete search history.

(56) References Cited

U.S. PATENT DOCUMENTS

| | | | |
|---|---|---|---|
| 5,450,593 A * | 9/1995 | Howell et al. ............... 713/200 |
| 6,029,160 A * | 2/2000 | Cabrera et al. ................. 707/1 |
| 6,061,721 A | 5/2000 | Ismael et al. | |
| 6,192,361 B1 * | 2/2001 | Huang ............................ 707/9 |
| 6,212,564 B1 * | 4/2001 | Harter et al. ............... 709/228 |
| 6,353,886 B1 * | 3/2002 | Howard et al. ............. 713/156 |
| 6,476,833 B1 * | 11/2002 | Moshfeghi .................. 715/854 |
| 2002/0198829 A1 * | 12/2002 | Ludwig et al. ............... 705/40 |

OTHER PUBLICATIONS

Stallings (William Stallings, "Cryptography and network security", 2th edition, 1998, ISBN: 0138690170).*
Stein (Lincoln D. Stein, "Web Sercurity, a step-by -step reference guide", 1998, ISBN: 0201634899).*
Minasi (Mark Minasi, Mastering Windows NT Server 4, 6th edition, 1999, ISBN: 0782124453).*

* cited by examiner

Primary Examiner—Jacques Louis-Jacques
Assistant Examiner—Peter Poltorak
(74) Attorney, Agent, or Firm—McDermott Will & Emery LLP

(57) ABSTRACT

A storage system has an RMI interface for managing a storage. In starting an access, a WWW server distributes a storage manager program including an authentication function to a WWW browser of a manager. After a manager authentication by using a registered manager information file, an RMI management object dynamically creates an authentication key unique to the manager and an RMI interface having a limited function corresponding to the authentication key, and transmits the authentication key to a storage management program of the manager. An authenticated manager is allowed to imitatively use the RMI interface in accordance with the authentication key.

10 Claims, 5 Drawing Sheets

FIG. 2

104 MANAGER INFORMATION FILE

```
user01 : PASSWORD 01 : USE PERIOD INFORMATION FILE NAME : USE PERMISSION FUNCTION
        FILE NAME : MOST RECENT LOG-OUT TIME
user02 : PASSWORD 02 : USE PERIOD INFORMATION FILE NAME : USE PERMISSION FUNCTION
        FILE NAME : MOST RECENT LOG-OUT TIME
user03 : PASSWORD 03 : USE PERIOD INFORMATION FILE NAME : USE PERMISSION FUNCTION
        FILE NAME : MOST RECENT LOG-OUT TIME
 ...
```
104a  104b         104e               104c              104d

104-1 USE PERMISSION PERIOD INFORMATION FILE

```
forbid  2001/01/01:10:10  -  2001/01/08:10:10
forbid  2001/01/01:10:10  -  2001/01/08:10:10
```

104-2 USE PERMISSION FUNCTION INFORMATION FILE

```
getMethod01 : on
getMethod02 : on
getMethod03 : on
getMethod04 : on
getMethod05 : off
setMethod01 : on
setMethod02 : off
setMethod03 : off
setMethod04 : off
setMethod05 : off
```

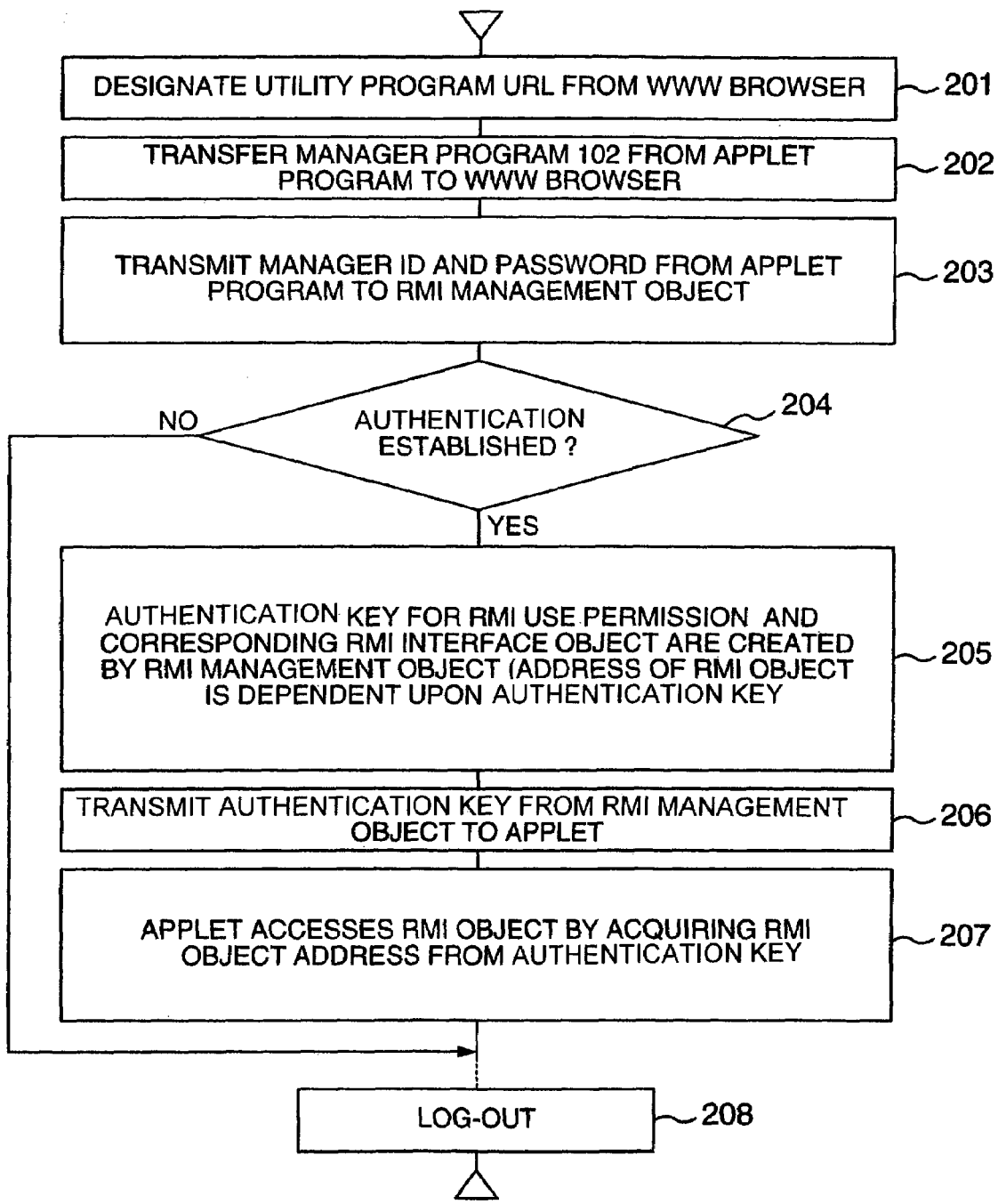

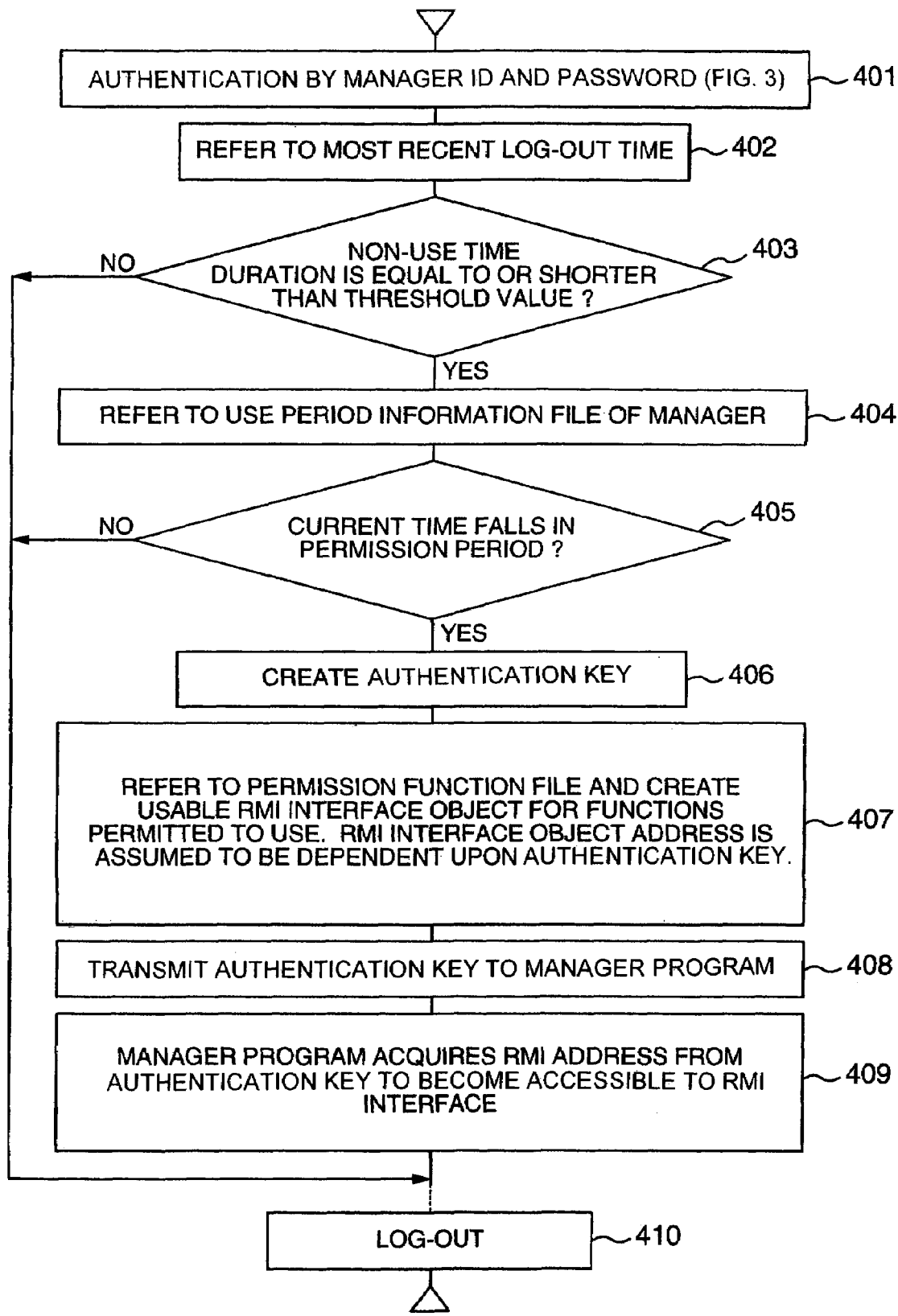

DISK MANAGEMENT INTERFACE

BACKGROUND OF THE INVENTION

The present invention relates to a storage system, and more particularly to techniques effective for application to remote management businesses of a storage system.

U.S. Pat. No. 6,061,721 issued to Ismael et al. teaches management communication between a manager and a Java virtual machine at an agent.

In remote operation of the contents and configuration of services which a storage system provides to users, it is necessary to provide a means for overwriting a configuration information database of the storage system. Conventional means for accessing data includes an access method by using a general purpose simple network management protocol (SNMP), an access method by creating a specific protocol and defining a specific interface for accessing a database to make an application program access the database by using the interface, or other access methods. Such an application program uses a program distributed and installed in each manager in advance. The program is allowed to be used only by those authenticated by an ID and password. This authentication mechanism is generally implemented beforehand in the application program.

(a) Technical Issues of Using SNMP Protocol

In the interface method of providing with a storage configuration information database by using SNMP, the storage configuration information database is required to be converted into a management information database (MIB) whose data is read/written by using simple commands (such as Get, Get/Next, and Set) defined by SNMP. The amount of storage configuration information is increasing remarkably nowadays. With the interface method, an overhead of a communication process time becomes large and the process speed lowers. Even simple information read/write requires to be controlled by using a complicated combination of commands on an application side. This control is not easy and the number of development processes increases, posing severe technical issues. Furthermore, since a general purpose interface is used, there is a fear that third parties may read/write data by using illegal programs.

A security function such as authentication is required to be implemented beforehand in an application program, which may increase illegal accesses. Management by using an SNMP protocol is associated with disadvantages in terms of performance and security.

(b) Technical Issues of Using Dedicated Protocol

Setting a dedicated protocol has advantages in terms of performance and security. However, an application for processing data results in a protocol dependent system. There arises therefore a problem that managers using different protocols cannot use the system in a versatile manner.

Further, it is necessary to create and distribute an application program for the operating system of each computer. This poses a technical issue that a large man power is necessary for implementation, maintenance, management and the like of a storage management system.

SUMMARY OF THE INVENTION

It is an object of the invention to provide efficient remove management techniques of a storage system by reducing the numbers of accesses and the amount of information transferred via an information network.

It is another object of the invention to realize storage system remote management software satisfying both security and versatility.

According to one aspect of the present invention, there is provided a storage management system comprising: a management object for controlling a request from a manager which manages a data file to be accessed by a user, the management object authenticating a second manager ID and a second manager password received from the manager, in accordance with a first ID and a first password stored beforehand; and interfaces to be created by the management object when the authentication of the second manager password and the second password by the management object succeeds, and to be expired after a predetermined time, the interfaces permitting an access from the authenticated manager.

More specifically, according to an embodiment, a storage management control interface may be provided in which a Java virtual machine (JVM) is provided in the storage system and a configuration information database of the storage provides a plurality of control functions to the external by using remote method invocation (RMI) protocol techniques.

This interface is dynamically created or loaded in a service processor in response to a request from a manager accessing via a network such as the Internet and an intranet, and expired when a log-out from a manager program is received. A use condition of the interface depends upon authentication of a manager ID and password. In order to identify a manager to which the use of the interface is permitted or prohibited, a manager information file is provided which may store a manager ID and password, a usable interface method (function) group, a use period, and most recent log-in/log-out times, respectively for each manager.

The manager program capable of referring to or altering the configuration information of the storage by using the interface is stored in the storage, and means may be provided for distributing the manager program to a remote WWW browser by using a hyper text transfer protocol (http) demon. This manager program is written with Java applets and can run on a WWW browser of any information processing apparatus having JVM.

BRIEF DESCRIPTION OF THE DRAWINGS

FIG. 2 is a conceptual diagram showing an example of information used by the storage system of the embodiment.

FIG. 3 is a flow chart illustrating an example of the operation of the storage system of the embodiment.

FIG. 4 is a flow chart illustrating an example of the operation of the storage system of the embodiment.

DETAILED DESCRIPTION OF THE EMBODIMENTS

An embodiment of the invention will be described in detail with reference to the accompanying drawings.

Figure 1:
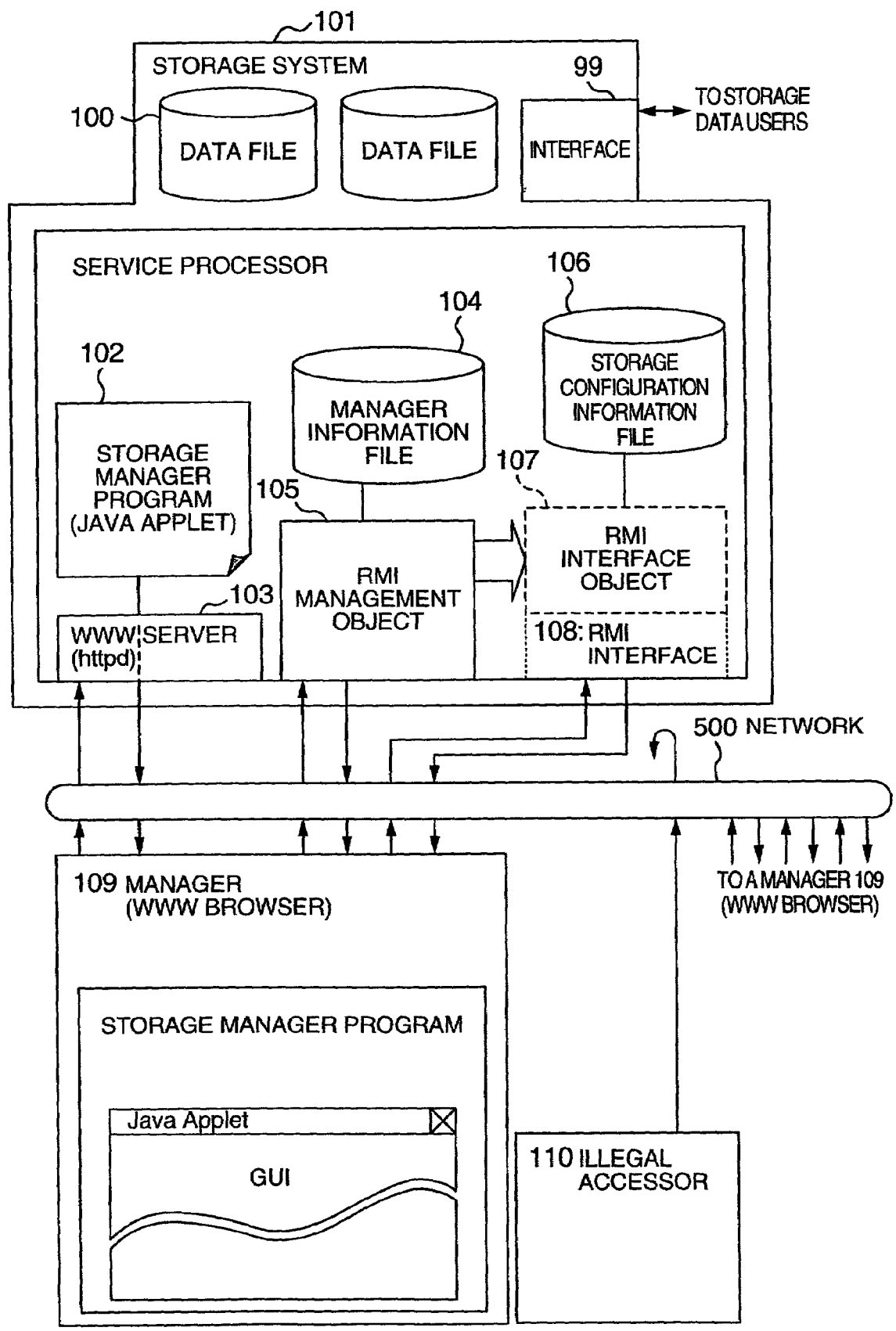
FIG. 1 is a conceptual diagram showing examples of the structure and operation of a management function of a storage system according to an embodiment of the invention.

A storage system of this embodiment has: a storage device 100 such as a disc storing a large capacity of data for inbound users or storage users connected via an interface 99;

and a management mechanism for managing the large capacity of data in response to an instruction from a manager 109 via a network 500 as shown in FIG. 1.

In this embodiment, the management mechanism of the storage system 101 has a service processor which stores software for controlling an access to the storage system 101 from a system of out-of-bound users such as managers via the network 500 such as the Internet and an intranet. An example of such software is constituted of a WWW server 103, an RMI management object 105, a remote maintenance interface RMI object 107 which is dynamically generated and expired or erased as will be later described, a Remote Method Invocation RMI interface 108, and a Java virtual machine (JVM) for providing these execution environments.

A storage configuration information file 106 stores the configuration information such as information on storage control mechanism for the data files or discs in the storage system 101 and information on the connection states of storage data users or a host computer to be connected to the data files or discs. By rewriting the configuration information, settings of the system configuration such as discs and the host computer can be altered.

In this embodiment, only the RMI interface object 107 created by Java RIM can access the storage configuration information file 106. These objects define interface method groups or function groups for reading/writing the storage configuration information file 106. These functions allowing data read/write are made public as the RMI interface 108.

The RMI interface object 107 is software which can exist by being dynamically created when necessary (it is possible to design in such a manner that the RMI interface object 107 is automatically expired if a non-access time of the RMI interface object becomes equal to or longer than a predetermined time). If this object 107 does not exist, access to the storage configuration information file 106 is permitted not at all. While this object 107 exists, the storage configuration information file 106 can be accessed from an external JVM computer. In this case, it is necessary to know an RMI address of the RMI interface object 107, and if the RMI address is not known, the storage configuration information file 106 cannot be accessed. When the RMI interface object 107 is dynamically created, the RMI address is randomly generated. By using this randomly assigned RMI address as an authentication key 107a and giving this authentication key 107a to only the manager permitted to use the RMI interface 108, a safer RMI interface 108 can be implemented.

While a plurality of managers access, a corresponding plurality of interfaces run in the service processor as software responding to each secret key or authentication key.

When the storage manager program 102 uses the RMI interface 108 via the network 500, the program 102 requests the RIM server program called the RMI management object 105 to create the RMI interface object 107, and after the RMI interface object 107 is created, the program 102 uses the RMI interface method or function. In this case, the RMI address as a key for accessing the RMI interface 108 is acquired from the RMI management object 105. However, this RMI address cannot be acquired unless the management object 105 is subjected to authentication by the manager information file 104. For example, authentication techniques of using a manager ID and password may be used. Namely, the manager information file 104 storing a list of manager ID's and passwords is prepared to perform authentication through comparison with information transmitted from the storage manager program. Therefore, the manager program connected to this interface cannot use this interface unless the authentication is made by the manager ID and password. A safer interface system can therefore be implemented.

With a conventional method of guaranteeing security by authentication by the manager program of the manager 109, if a program miss or a security hole of the manager program is found, there is a fear that the storage configuration information file is accessed via this application program. In addition, if a third party creates an illegal access program for accessing the interface, the interface may be stopped or is required to be created again.

With the interface system of the storage system 101 of this embodiment, if existence of an illegal access program (illegal accessor 110) or a manager program with a security hole is detected by some means, a flag to be later described and provided for the manager using such a program is turned off to cancel the privilege. In this manner, an access can be forbidden so that the whole system is not required to be stopped.

As will be later illustratively described with reference to FIG. 5, this interface is constituted of a plurality of methods or functions, and provided with a function of limiting a permission period, defining a method group or function group which the manager is permitted to use, and forbidding the manager not using the interface for a predetermined period or longer. This functional operation will be described with reference to FIGS. 2, 3 and 4.

As illustratively shown in FIG. 2, the manager information file 104 to be used for authentication by the RMI management object may store for each registered manager: information such as a manager ID 104a and a password 104b; a file name 104c of a permission period information file 104-1 storing a permission period; a file name 104d of a permission function information file 104-2 storing information on a use permission function group; a most recent log-out time 104e; and the like.

As illustrated in the flow chart of FIG. 3, a manager already registered in the manager information file 104 designates a uniform resource locator (URL) of a utility program such as the WWW server 103 of the storage system 101 on the network 500 such as the Internet, to thereby access the WWW server 103 (Step 201). The WWW server 103 transmits the storage manager program 102 written with Java applets or the like to the WWW browser of the manager 109 (Step 202).

The manager acquires information necessary for authentication such as the manager ID 104a and password 104b from the authentication interface built in the storage manager program 102, and transmits the acquired information to the RMI management object 105 (Step 203).

In accordance with the procedure as will be illustratively described with reference to FIG. 4, the RMI management object 105 executes an authentication process for the manager, and if the authentication succeeds (Step 204), creates the authentication key 107a (RMI object address) necessary for RMI use permission, and creates the RMI interface object 107 corresponding to the authentication key 107a (Step 205).

The RMI management object 105 transmits the authentication key 107a to the storage manager program 102 running on the WWW browser of the manager 109 (Step 206).

The storage manager program 102 acquires the RMI object address from the received authentication key 107a to thereafter access the RMI interface 108 of the RMI interface object 107 and perform a desired system management work and the like such as reference and alteration of the configuration information of the storage system 101 (Step 207).

Thereafter, a log-out process is executed in accordance with the will of the manager using the storage manager program 102 or a forcible log-out from the system side because of the access time limit (Step 208).

If the authentication fails at Step 204 (in the case of the illegal accessor 110), the log-out is performed forcibly (Step 208).

With reference to the flow chart shown in FIG. 4, the authentication process to be executed by the RMI management object 105 in the storage system 101 of this embodiment will be described more in detail.

First, authentication is made by comparing the manager ID and password transmitted from the manager side with the contents registered in the manager information file 104 (Step 401) and reference is made to the end time (log-out time 104e) of the RMI interface object most recently accessed by the manager (Step 402). A non-use time duration is calculated from the log-out time 104e and a current time, and if the non-use time duration exceeds a threshold value (Step 403), the RMI interface object is not created but a forcible log-out of the manager is executed (Step 410). In this manner, it is possible not to give a use permission to the manager in a long non-use time duration state.

If it is judged at Step 403 that the non-use time duration does not exceed the threshold value, then reference is made to the permission period information file 104-1 by using the list in the manager information file 104 (Step 404). If the current time does not fall in the use permission period written in the use permission period information file 104-1 (Step 405), the RMI interface object is not created, but the forcible log-out of the manager is executed (Step 410). In this manner, the period can be limited for each manager.

If the judgment Step 405 is asserted, first the authentication key 107a is created (Step 406). Then, as illustratively shown in FIG. 5, the function group to be permitted to use is discriminated from the use permission function information file 104-2 by using the list in the manager information file 104, and the RMI interface object 107 is created in accordance with the information of the permitted function group and authentication key 107a (Step 407). The RMI interface object 107 has therein the permission flag 107b for each function 107c. Each function 107c can be used only when the use permission flag 107b is valid and in addition since the RMI interface object address is dependent upon the authentication key 107a, the manager not having the authentication key 107a cannot use the RMI interface object.

Thereafter, the management object 105 transmits the authentication key 107a to the storage manager program in the browser 109 (Step 408).

In accordance with the authentication key 107a received from the RMI interface object 107, the storage manager program of the manager obtains the RMI address so that the RMI interface 108 can be accessed (Step 409).

After necessary access is completed, the log-out is executed (Step 410). An access time at Step 409 may be monitored and if the access time exceeds a predetermined time, a forcible log-out may be performed.

Figure 5:
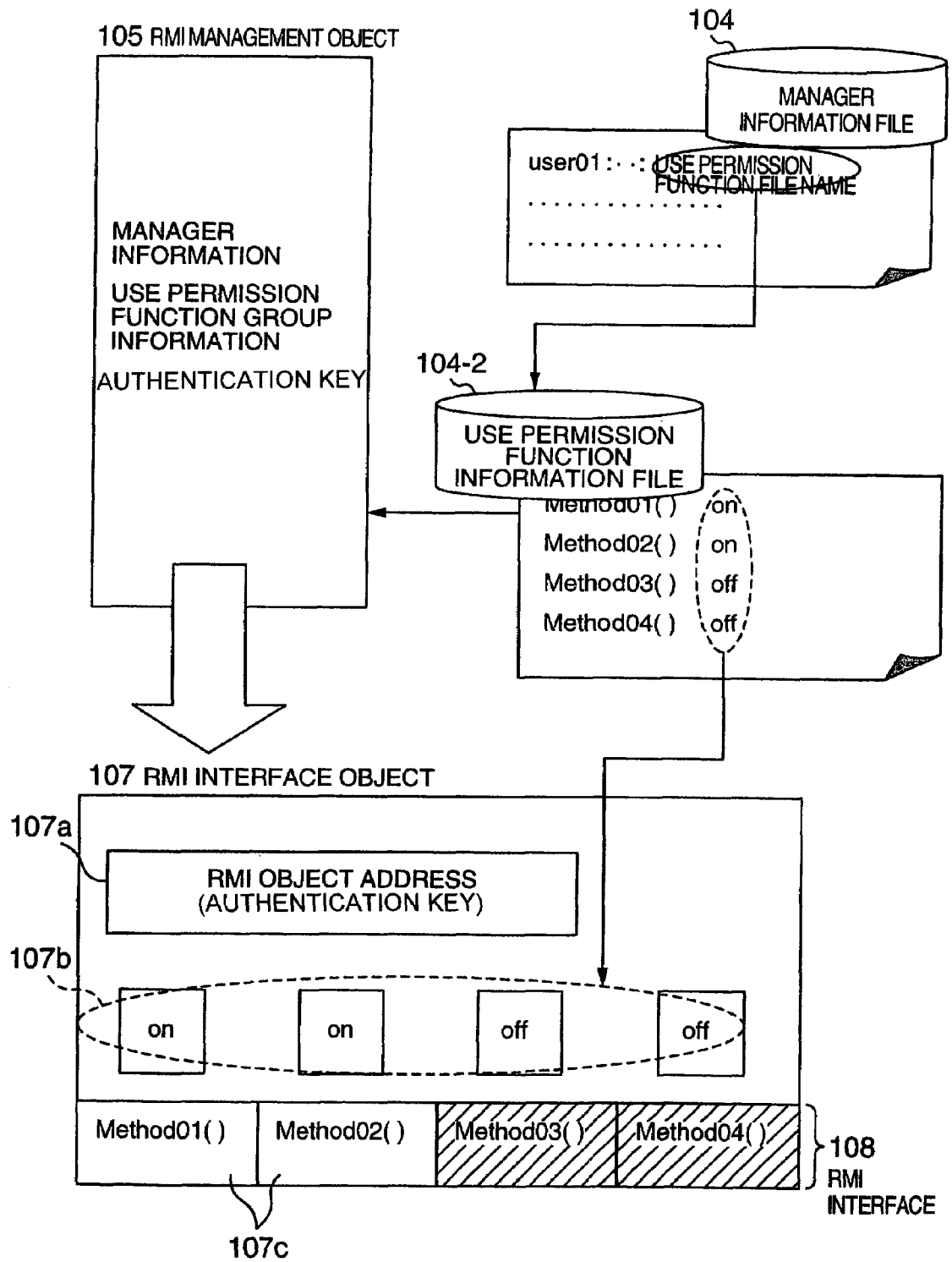
FIG. 5 is a conceptual diagram showing flow chart illustrating an example the operation of the storage system of the embodiment.

As described above, in the storage system 101 of the embodiment, when the RMI management object 105 creates the RMI interface object 107, the RMI management object 105 sets use permission flags 107b in accordance with the contents of the use permission period information file 104-1 and permission function information file 104-2 (FIG. 5). It is therefore possible to limit the usable functions 107c and their use period.

By using a combination of these security techniques, the embodiment can implement a storage management control system having a high security and a high degree of operation freedom.

For example, it is possible to validate those methods (functions) 107c only referred by a manager or to permit only a particular manager to use methods during some period. The interface program can be made unusable for all managers by a single flag reset operation without stopping the interface program, when a sub-system or the like of the storage system 101 or the like is to be subjected to a maintenance operation.

The RMI interface object 107 and RMI interface 108 can be defined as desired covering simple functions to high performance functions. Since Java RMI which is prevailing as a computer language is used, linkage to optional Java applications is easy and the storage manager program 102 can be easily developed.

The interfaces such as the RMI interface object 107 and RMI interface 108 of this embodiment can communicate with Java applet programs running on a Java WWW browser 109 having an RMI communication function. According to the embodiment, the storage system 101 has the storage manager program 102 and the WWW server 103 for distributing the program 102 to clients, the storage manager program 102 being created by Java applets and having interfaces such as the RMI interface object 107 and RMI interface 108. Accordingly, any information processing system having JVM can observe the storage system 101 or perform necessary operations for the storage system 101 via the WWW browser 109. It is therefore possible to dispense with complicated works such as a work of distributing a specific management program to each manager.

As described so far, according to the embodiment, since the remote method such as Java RMI is applied to the storage management control interface, the load of the network is low and versatile and high performance methods (functions) can be defined easily. Accordingly the management software for management control or the like of the storage system 101 can be developed easily.

Manager interfaces such as the RMI interface object 107 and RMI interface 108 for management control or the like of the storage system do not exist before authentication, and exist only after the authentication. Since the interfaces cannot exist without the authentication, a management control interface system for the storage system 101 can be implemented with high security.

The management control software specific to a manager to be connected to the interface for management control or the like of the storage system 101 is not necessary to have a authentication function. This provides the effects of preventing security from being lowered by giving the authentication function to specific management control software.

It is possible to limit the use permission period and define the permission function for each manager. Accordingly, a security policy can be set finely for each manager. For example, a temporary use prohibition or a limitation to only a read process can be set to all users.

Since the storage system has the WWW server 103 and can distribute the storage manager program 102 written with Java applets or the like, the client software used by a manager is required to have only the WWW browser 109 with JVM. It is therefore easy to implement a storage management control system capable of using the management control software.

The invention made by the inventor has been described specifically with reference to the embodiment. The invention is not limited only to the above-described embodiment, but various modifications can obviously be made without departing from the aspects of the invention.

What is claimed is:

1. A storage system comprising:
a storage device for storing data files to be accessed by one or more users; and
a storage management system for managing the storage device, the storage management system comprising:
a management object for controlling management access in response to a request from a manager connected to the storage management system through a network, said management object authenticating a second manager ID and a second password received through the network from the manager, in accordance with a first ID and a first password stored beforehand to authenticate the manager;
a storage configuration information file containing settings of the storage system with respect to operation of the storage device; and
a temporary software interface object for accessing the settings in the storage configuration information file through the network, said temporary software interface object to be created by said management object when both authentication of the second manager ID and authentication of the second password by said management object succeed, and to be expired after a predetermined permission time, wherein:
the authenticated manager's access to the settings contained in the storage configuration information file is permitted only while the temporary software interface object exists,
said management object transmits a key, comprising a randomly generated address of the temporary software interface object needed for communication through the network with the temporary software interface object, to the authenticated manager to enable management access to the storage configuration information file, and
said temporary software interface object permitting an access to the settings in the storage configuration information file is erased after lapse of said predetermined permission time so as to expire access by the authenticated manager.

2. A storage system according to claim 1, wherein said temporary software interface object created by said management object is expired when a log-out sent from the authenticated manager at the end of the access is received.

3. A storage system according to claim 1, wherein:
the temporary software interface object created for the authenticated manager enables use of a subset of management functions available through the storage management system when accessing the storage configuration information file; and
the subset of management functions is defined by a stored information file for the authenticated manager from among a plurality of individualized stored information files for a plurality of managers.

4. A storage system according to claim 1, wherein said management object determines not to create a temporary software interface object if a non-use period from most recent log-out of the manager exceeds a predetermined period when the second manager ID and the second password are authenticated.

5. A storage system according to claim 1, further comprising an information file for storing a plurality of functions of a remote method invocation protocol and a plurality of flags for defining which manager is permitted to use which function.

6. A storage system according to claim 5, wherein said information file stores a flag for temporarily stopping the use of the created interfaces in response to a maintenance request.

7. A storage system according to claim 1, further comprising a storage for storing a Java virtual machine having a Java applet program, wherein the Java applet program is transmitted to the manager in response to a request from the manager.

8. A storage management method comprising:
providing user access to data files stored in a storage device of a storage system, based at least in part on settings of the storage system contained in a storage configuration information file accessible via a storage management system;
authenticating a second manager ID and a second password received by the storage management system from a manager through a network, in accordance with a first ID and a first password stored beforehand, to authenticate the manager;
creating for the authenticated manager a temporary software interface object at the storage management system needed for accessing the storage system settings contained in the storage configuration information file through the network, when both authentication of the second manager ID and authentication of the second password succeed, wherein the authenticated manager's access to the settings contained in the storage configuration information file is permitted by the storage management system only while the temporary software interface object exists;
transmitting a key, comprising a randomly generated address of the temporary software interface object needed for communication through the network with the temporary software interface object, to the authenticated manager to enable management access to the storage configuration information file; and erasing the temporary software interface object after a lapse of a predetermined permission time, so as to expire the authenticated manager's ability to access the settings in the storage configuration information file.

9. A method according to claim 8, further comprising expiring the temporary software interface object when a log-out sent from the authenticated manager at the end of the access is received.

10. A method according to claim 8, wherein:
the temporary software interface object created for the authenticated manager enables use of a subset of management functions available through the storage management system when accessing the storage configuration information file; and
the subset of management functions is defined by a stored information file for the authenticated manager from among a plurality of individualized stored information files for a plurality of managers.

* * * * *